(12) United States Patent
Shearer

(10) Patent No.: US 7,080,112 B2
(45) Date of Patent: Jul. 18, 2006

(54) METHOD AND APPARATUS FOR COMPUTING AN APPROXIMATION TO THE RECIPROCAL OF A FLOATING POINT NUMBER IN IEEE FORMAT

(75) Inventor: James Bergheim Shearer, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 625 days.

(21) Appl. No.: 10/292,768

(22) Filed: Nov. 13, 2002

(65) Prior Publication Data

US 2004/0093367 A1 May 13, 2004

(51) Int. Cl.
*G06F 7/38* (2006.01)
(52) U.S. Cl. .................................. 708/502
(58) Field of Classification Search ............... 708/504, 708/654, 502
See application file for complete search history.

(56) References Cited

U.S. PATENT DOCUMENTS

| | | | |
|---|---|---|---|
| 5,153,851 A | * | 10/1992 | Kanazawa et al. .......... 708/654 |
| 5,563,818 A | | 10/1996 | Agarwal et al. |
| 5,768,171 A | * | 6/1998 | Chow ......................... 708/654 |
| 6,163,791 A | | 12/2000 | Schmookler et al. |
| 6,240,433 B1 | | 5/2001 | Schmookler et al. |
| 6,260,054 B1 | * | 7/2001 | Rosman et al. ............. 708/502 |
| 6,769,006 B1 | * | 7/2004 | Krouglov et al. ........... 708/502 |

* cited by examiner

Primary Examiner—Chuong D. Ngo
(74) Attorney, Agent, or Firm—Whitham, Curtis, Christofferson & Cook, PC; Stephen C. Kaufman

(57) ABSTRACT

A method and apparatus allows the quick computation of an estimate of the reciprocal of a floating point number in IEEE format. A table with $2^k$ entries allows the computation of an estimate with $2 \times k+3$ good bits. x is a floating point number in IEEE format for which a reciprocal approximation is to be computed. $\hat{x}$ be a floating point number in IEEE format derived from x by leaving the sign bit unchanged, complementing the exponent bits, leaving the first k fraction bits unchanged, and complementing the remaining fraction bits. t is another floating point number in IEEE format found by using the first k bits of the fraction of x as an index into a table with $2^k$ entries. The product $\hat{x} \times t$ computed with IEEE floating point arithmetic is an estimate of the reciprocal of x with $2 \times k+3$ good bits (i.e., relative error less than $2^{-2 \times k+3}$).

8 Claims, 2 Drawing Sheets

METHOD AND APPARATUS FOR COMPUTING AN APPROXIMATION TO THE RECIPROCAL OF A FLOATING POINT NUMBER IN IEEE FORMAT

BACKGROUND OF THE INVENTION

1. Field of the Invention

The present invention generally relates to floating point processors in high speed digital computers and, more particularly, to an improved method to compute an approximation of the reciprocal of a floating point number in the IEEE (Institute of Electrical and Electronics Engineers) format.

2. Background Description

Floating point arithmetic units are commonly used in central processing units (CPUs) of digital computers, especially high performance superscalar processors such as reduced instruction set computers (RISC). An example of a RISC processor is the IBM PowerPC® used in the IBM RISC System/6000 computer. Such processors typically include an input/output (I/O) unit interfacing with an instruction/data cache and a branch processor, one or more fixed point processors and one or more floating point processors.

The semantics of floating point instructions has not been as clear cut as the semantics of the rest of the instruction set. To address this problem, the computer industry has standardized on the floating point format by IEEE standard 754-1985. The IEEE standard defines 32-bit and 64-bit floating point formats. Each consists of (from left to right) a sign bit, an e-bit exponent and an f-bit fraction. The exponent is assumed to be biased with bias $2^{(e-1)}-1$ and it is assumed that an implicit 1 is to be appended to the front (left) of the fraction. The IEEE 32-bit format has e=8 and f=23. The IEEE 64-bit format has ee=11 and f=52. The present invention will work for these and similar formats (with different values for e and f). The IEEE standard also defines the result of arithmetic operations on floating point numbers in these formats.

Of the four basic arithmetic operations of addition, subtraction, multiplication, and division, division is the most difficult to implement efficiently. One way of performing a floating point division x/y is to compute it as x×(1./y). This can be done by finding a relatively low accuracy initial approximation to 1./y, using an iterative method to refine the low accuracy approximation to the desired accuracy, and then multiplying by x. This method is particularly attractive when it is unnecessary to obtain the exact IEEE specified value for x/y. However, the method requires a method for finding an initial approximation to the reciprocal of the floating point number y. The present invention provides such a method.

The problem of finding a good easily computed initial approximation to the reciprocal of a floating point number is well known and has been solved in various ways in both hardware and software. The IBM PowerPC® architecture defines a FRES operation which has generally been implemented using a simple lookup table. A table size of $2^k$ will produce an approximation with k+1 good bits. More complicated hardware methods are also known. An initial approximation with 4.3 good bits can be computed with a single integer subtraction. This method has been used in IBM's vector MASS software.

U.S. Pat. No. 5,563,818 to Agarwal et al., U.S. Pat. No. 6,163,791 to Schmookler et al., and U.S. Pat. No. 6,240,433 to Schmookler et al. include methods for finding an initial approximation to the reciprocal of a floating point number that are similar to the present invention in that they combine table lookup with a floating point multiply-add to produce the initial approximation. However, the Agarwal et al. and Schmookler et al. methods are relatively complex in their implementations. What is needed is a simpler method which simplifies both hardware and software implementations and results in a quicker computation of an estimate of the reciprocal of a floating point number in IEEE format.

SUMMARY OF THE INVENTION

It is therefore an object of the present invention to provide a method which allows the quick computation of an estimate of the reciprocal of a floating point number in IEEE format.

The method according to the invention produces a better combination of speed, accuracy and simplicity than other known methods. The invention produces twice the number of correct bits as a simple table lookup (for the same size table) with the additional cost of a floating point multiply. Since it takes two floating point multiply-add instructions to double the accuracy of the initial approximation (using an iterative method), this is a significant improvement over the prior art. The advantages of the invention are particularly apparent for software implementations where simplicity is very important as it reduces the number of instructions required to generate the initial approximation.

In the practice of the invention, a table with $2^k$ entries allows the computation of an estimate with 2×k+3 good bits (as compared with k+1 good bits for a simple table lookup). By way of illustrative example, let x be a floating point number in IEEE format for which a reciprocal approximation is to be computed. Let $\hat{x}$ be a floating point number in IEEE format derived from x as follows: Leave the sign bit unchanged, complement the exponent bits, leave the first k fraction bits unchanged, complement the remaining fraction bits. Note that $\hat{x}$ can be computed from x with a single exclusive OR operation. Let t be another floating point number in IEEE format found by using the first k bits of the fraction of x as an index into a table with $2^k$ entries. Then, if the table is chosen correctly, the product $\hat{x} \times t$ computed with IEEE floating point arithmetic will be an estimate of the reciprocal of x with 2×k+3 good bits (i.e., relative error less than $2^{-2 \times k+3}$).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
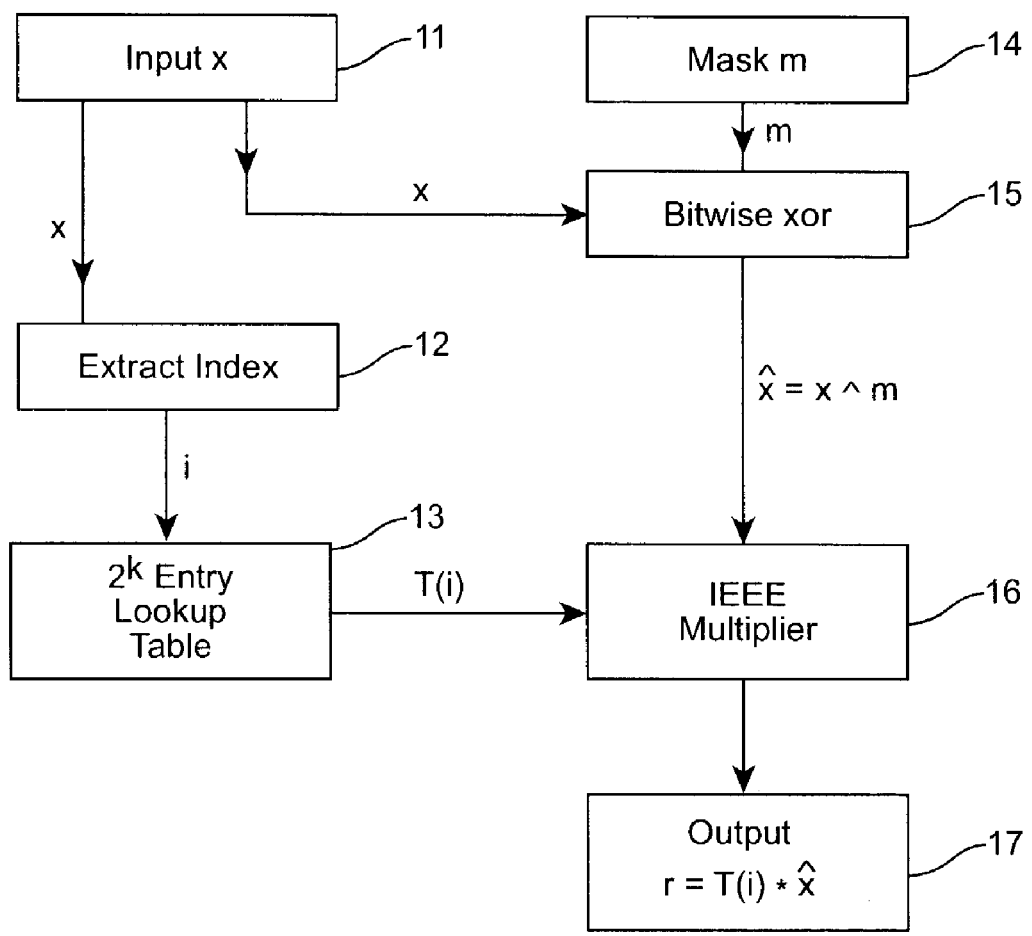
FIG. 1 is a block diagram illustrating the principle components and data flow of the preferred embodiment of a hardware implementation of the invention.

Referring now to the drawings, and more particularly to FIG. 1, there is shown a register 11 which receives the input x. The input x is a binary floating point number in the IEEE format. This consists of (from left to right) a 1-bit sign, an e-bit exponent, and an f-bit fraction. The exponent is assumed to be biased with bias $2^{e-1}-1$ and it is assumed that an implicit 1 is to be added at the front of the fraction. The IEEE 32-bit format has e=8 and f=23. The IEEE 64-bit format has e=11 and f=52.

The value x is input to function block 12 which extracts an index i which, in turn, is used to address a lookup table 13. The lookup table 13 has $2^k$ entries, where k is an adjustable parameter. A larger value of k gives a better approximation but requires a larger lookup table. The index i consists of the leftmost k fraction bits of x. It can assume values of 0 through $2^k-1$ inclusive.

A register 14 holds a mask m which depends on k. The mask m consists of (from left to right) one zero bit corresponding to the sign bit of x, e one bits corresponding to the exponent bits of x, k zero bits corresponding to the left most k fraction bits of x, and f−k one bits corresponding to the remaining fraction bits of x. The value x from register 11 and the mask m from the register 14 are combined in a bitwise exclusive OR 15 to produce $\hat{x}$, the bitwise exclusive OR of x and m which consists of (from left to right) the sign bit of x, the complement of the exponent bits of x, the first k fraction bits of x and the complement of the remaining f−k fraction bits of x.

The lookup table 13 contains $2^k$ entries in the same format as x. Let $\delta=2.^{-k}$, $\epsilon=2.^{-f}$ and $z=1+i\times\delta+0.5(\delta-\epsilon)$, where i is the index used to address the lookup table. Then, the ith entry, T(i), in the lookup table is $$\frac{4}{(8z^2 - (\delta - \varepsilon)^2 - \varepsilon^2)}.$$

This is output to IEEE floating point multiplier 16, which also receives $\hat{x}$ from exclusive OR 15. The multiplier output at register 17 is an estimate of the reciprocal of x which is $r=T(i)\times\hat{x}$.

Figure 2:
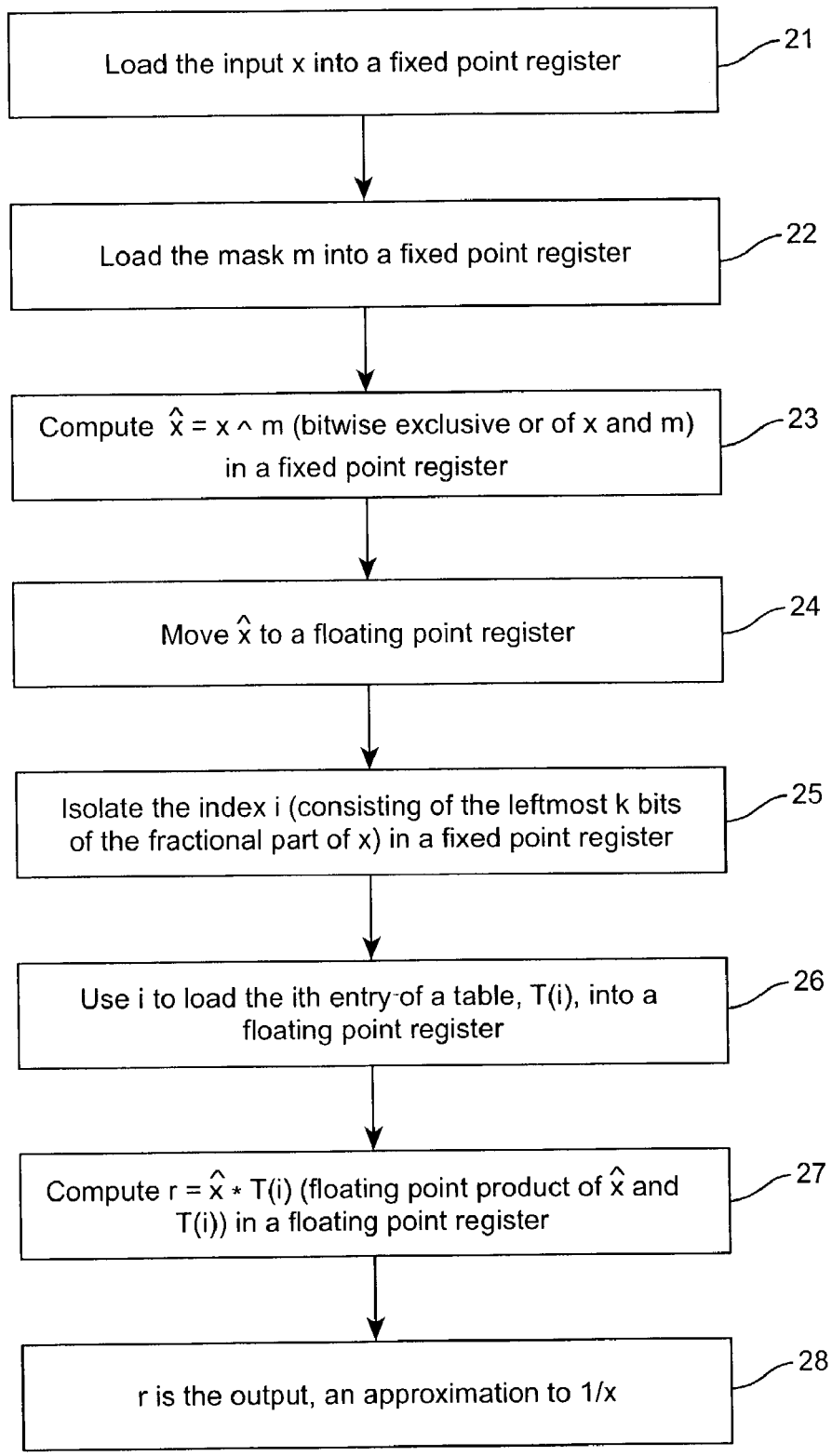
FIG. 2 is a flow diagram illustrating the logic of a software implementation of the preferred embodiment of a software implementation of the invention.

FIG. 2 is a flow diagram showing the logic of a software implementation of the invention. It will be understood from the following description that the software implements the process performed by the hardware shown in FIG. 1. The process is initiated in function blocks 21 and 22 where the input x is loaded into a first fixed point register and the mask m is loaded into a second fixed point register, respectively. Then, in function block 23, the bitwise exclusive OR of x and m is computed, i.e., $\hat{x}=x\wedge m$, and $\hat{x}$ is loaded into a third fixed point register. In function block 24, $\hat{x}$ is moved to a floating point register. Then, in function block 25, the index i, consisting of the leftmost k bits of the fractional part of x, is isolated and moved to a fixed point register. In function block 26, the index i is used to load the ith entry of a table, T(i), into a floating point register. Now, the reciprocal r is computed as $r=\hat{x}\times T(i)$ and the result is loaded in a floating point register in function block 27. Finally, in function block 28, the reciprocal r is output as an approximation to 1./x.

While the invention has been described in terms of preferred hardware and software embodiments, those skilled in the art will recognize that the invention can be practiced with modification within the spirit and scope of the appended claims.

Having thus described my invention, what I claim as new and desire to secure by Letters Patent is as follows:

1. A computer-implemented method of computing a computing machine representation of an approximation to the reciprocal of a floating point number x comprising the steps of:

generating a computing machine representation of a floating point number $\hat{x}$ by leaving a sign bit of x, which is loaded into a first fixed point register, unchanged, complementing exponent bits of x, leaving a first k fraction bits of x unchanged, and complementing remaining fraction bits of x;

generating another computing machine representation of a floating point number t found by using the first k bits of the fraction of x, which is loaded into said first fixed point register, as an index into a table with $2^k$ entries; and computing the product $\hat{x}\times t$ computed with floating point arithmetic as an estimate of the reciprocal of x with 2×k+3 good bits which is loaded into a floating point register; and outputting said estimate of the reciprocal of x to be used by a high speed digital computer.

2. The computer-implemented method of computing a computing machine representation of an approximation to the reciprocal of a floating point number x as recited in claim 1, wherein the floating point number x is in IEEE format, the floating point number $\hat{x}$ is in IEEE format, the floating point number t is in IEEE format, and the product $\hat{x}\times t$ is in IEEE format.

3. The computer-implemented method of computing a computing machine representation of an approximation to the reciprocal of a floating point number x as recited in claim 1, wherein $\hat{x}$ is computed from x with a single bitwise exclusive OR operation with a mask m which is loaded into a second fixed point register.

4. The computer-implemented method of computing a computing machine representation of an approximation to the reciprocal of a floating point number x as recited in claim 3, wherein the mask m consists of one zero bit corresponding to the sign bit of x, e one bits corresponding to the exponent bits of x, k zero bits corresponding to the first k fraction bits of x and f−k one bits corresponding to the remaining f−k fraction bits of x.

5. The computer-implemented method of computing a computing machine representation of an approximation to the reciprocal of a floating point number x as recited in claim 1, wherein said table is a lookup table containing $2^k$ entries in the same format as x, the ith entry, T(i), in the lookup table is, $$\frac{4}{(8z^2 - (\delta - \varepsilon)^2 - \varepsilon^2)},$$

where i is the index used to address the lookup table, $\delta=2^{-k}$, $\epsilon=2^{-f}$ and $z=1+i\times\delta+0.5(\delta-\epsilon)$.

6. An apparatus for computing an approximation to the reciprocal of a floating point number x comprising:

a first register storing the number x comprising a 1-bit sign, an e-bit exponent, and an f-bit fraction;

a second register storing a mask m mask comprised of one zero bit corresponding to the sign bit of x, e one bits corresponding to the exponent bits of x, k zero bits corresponding to the first k fraction bits of x and f−k one bits corresponding to the remaining f−k fraction bits of x;

a bitwise exclusive OR function combining the number x from the first register and the mask m from the second register to produce a bitwise exclusive OR output $\hat{x}=x\wedge m$;

an index extractor extracting the first k bits of the fraction of x as an index I;

a lookup table with $2^k$ entries responding to the index i and outputting an entry T(i) as the ith entry of the table; and a multiplier computing the product $\hat{x} \times T(i)$ with floating point arithmetic an output $r=T(i) \times \hat{x}$ as an estimate of the reciprocal of x with $2 \times k+3$ good bits.

7. The apparatus for computing an approximation to the reciprocal of a floating point number x as recited in claim 6, wherein the floating point number x is in IEEE format, the floating point number {circumflex over (x)} is in IEEE format, the floating point number T(i) is in IEEE format, and the product {circumflex over (x)}.times.T(i) is in IEEE format.

8. The apparatus for computing an approximation to the reciprocal of a floating point number x recited in claim 6, wherein the lookup table contains $2^k$ entries in the same format as x, the ith entry, T(i), in the lookup table is $$\frac{4}{(8z^2 - (\delta - \varepsilon)^2 - \varepsilon^2)},$$

where i is the index used to address the lookup table, $\delta=2^{-k}$, $\epsilon=2^{-f}$ and $z=1i \times \delta+0.5(\delta-\epsilon)$.

* * * * *